Figure 1:
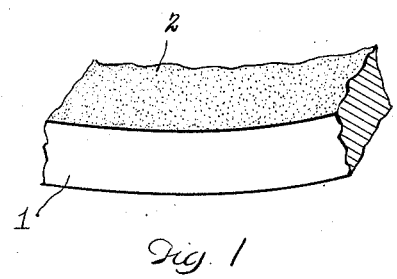

Oct. 13, 1925.  
F. J. FRINK ET AL  
1,556,925  
METALLIC MOLD FOR FORMING GLASS ARTICLES AND METHOD OF MAKING SAME  
Filed March 31, 1922

INVENTORS
Fred James Frink and
Robert Leonardson Frink
BY
Fay, Oberlin & Fay
ATTORNEYS Patented Oct. 13, 1925.

1,556,925

UNITED STATES PATENT OFFICE.

FRED JAMES FRINK, OF LANCASTER, OHIO, AND ROBERT LEONARDSON FRINK, OF LONDON, ENGLAND.

METALLIC MOLD FOR FORMING GLASS ARTICLES AND METHOD OF MAKING SAME.

Application filed March 31, 1922. Serial No. 548,323.

*To all whom it may concern:*

Be it known that we, FRED JAMES FRINK and ROBERT LEONARDSON FRINK, both citizens of the United States, and residents of Lancaster, county of Lancaster, State of Ohio, U. S. A., and of London, England, respectively, have jointly invented a new and useful Improvement in Metallic Molds for Forming Glass Articles and Methods of Making Same, of which the following is a specification, the principle of the invention being herein explained and the best mode in which we have contemplated applying that principle, so as to distinguish it from other inventions.

This invention relates to metallic molds, especially those intended for the manufacture of blown glass articles, such as electric lamp bulbs, laboratory apparatus, etc. Heretofore for forming the better classes of glassware it has been customary to use metallic molds, usually made of iron, copper, or like materials. The inner surfaces of such molds are made so as to conform to the contour of the article to be made or formed therein, and before use they are coated with paste, composed of mixtures such as graphite and oil, or charcoal and oil or wax, which on heating furnish a semi-charred, graphite, or carbon coating on the aforesaid inner surfaces. This method of preparing the inner surfaces of the molds by the production of a special coating thereon entails several disadvantages, chief amongst which are the expense incident to the maintenance and up-keep of the coated molds owing to the shortness of their useful life, which is only a few hours, and the irregularities in the prepared surfaces, by reason of which considerable damage and loss of ware takes place.

According to the present invention we overcome the above stated disadvantages by employing metallic molds in which the inner surfaces of the molds themselves are of a vascular nature, thus dispensing with the necessity of applying any coating to the inner surfaces of the molds before use. The molds are so made that the vascularity or very finely pitted nature of the inner surfaces extends for some distance into the body of the molds but not necessarily throughout the entire thickness thereof, so that the interior surface of the molds allow absorption of gases or liquids to take place for some depth into the body.

To the accomplishment of the foregoing and related ends the invention, then, consists of the steps and means hereinafter fully described and particularly pointed out in the claims, the annexed drawing and the following description setting forth in detail certain means and one mode of carrying out the invention, such disclosed means and mode illustrating, however, but one of various ways in which the principle of the invention may be used.

In said annexed drawing:—

Figure 2:
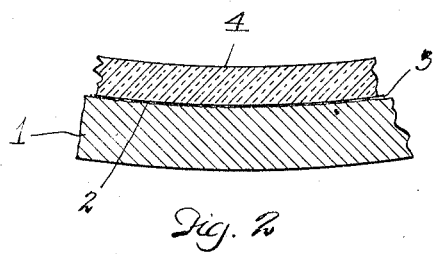

Fig. 1 is a broken sectional view of a typical glass mold constructed in accordance with our present invention; and Fig. 2 is a similar view illustrating such mold under conditions of use.

For producing molds having their inner surfaces of this vascular character, it is necessary to use as the material for the molds an alloy the constituents of which are attacked to a varying extent by the action of suitable solvent reagents. For this purpose suitable alloys are those of aluminium with alkaline earth metals, such as calcium or barium, or with magnesium. On subjecting the interior of a mold made of an aluminium calcium alloy to the action of an aqueous solution of an alkali metal hydroxide an attack of the constituents of the alloy takes place, producing a vascular or finely pitted surface; the pitting of the surface however is of so minute a character that its uniformity is unaffected as far as any action on the glass surface of the articles formed therein is concerned. Other suitable alloys for the purpose of this invention may be obtained by substituting copper for aluminium in the alloys previously referred to.

Preferably the molds are dipped in water or other fluid before use, whereby owing to the vascular nature of the inner surface a certain quantity of fluid is absorbed into the mold body so that on heating a vapour film is formed which prevents the surface of the glass article formed in the mold from actually contacting with the surface of the said mold. If desired, however, and with glass of certain compositions and intended for use for specific purposes, the molds may be used without previously dipping them in water, in which case the air absorbed in the vascules or pits on the inner surface will on heating provide a gaseous film between the metallic surface of the mold and the glass article which film serves the same purpose as the vapour film.

The broken sectional view of a typical mold 1, shown in Fig. 1, illustrates in magnified form the pitting of the mold surface 2, as hereinbefore described; while Fig. 2 illustrates the manner in which a film 3 is formed on such surface by the vapourizing of the fluid absorbed into the mold body, when a hot mass of molten glass 4 comes in contact with such finely pitted or vascular surface.

Other forms may be employed embodying the features of our invention instead of the one here explained, change being made in the form or construction, provided the elements stated by any of the following claims or the equivalent of such stated elements be employed, whether produced by our preferred method or by others embodying steps equivalent to those stated in the following claims.

We therefore particularly point out and distinctly claim as our invention:—

1. A mold for forming articles from molten glass, said mold being made of a metallic alloy and having its inner surface of a vascular or finely pitted character.

2. A mold for forming articles from molten glass, said mold being made of a light metal alloy and having its inner surface of a vascular or finely pitted character.

3. A mold for forming articles from molten glass, said mold being made of an aluminum calcium alloy and having its inner surface of a vascular or finely pitted character.

4. The method of making a mold for forming articles from molten glass, which consists in shaping such mold from a metallic alloy, and then subjecting the surface thereof designed thus to form such glass to chemical action, whereby such surface is given a vascular or finely pitted character.

5. The method of making a mold for forming articles from molten glass, which consists in shaping such mold from a light metal alloy, and then subjecting the surface thereof designed thus to form such glass to chemical action, whereby such surface is given a vascular or finely pitted character.

6. The method of making a mold for forming articles from molten glass, which consists in shaping such mold from an aluminum calcium alloy, and then subjecting the surface thereof designed thus to form such glass to the action of an alkali metal hydroxide in solution, whereby such surface is given a vascular or finely pitted character.

Signed by me, at Lancaster, Ohio, this 20 day of February, 1922.

FRED JAMES FRINK.

Signed by me, at Cleveland, Ohio, this 29th day of March, 1922.

ROBERT LEONARDSON FRINK.